(12) United States Patent
Cornelius et al.

(10) Patent No.: US 7,739,729 B2
(45) Date of Patent: Jun. 15, 2010

(54) ELECTRONIC SECURITY SYSTEM AND SCHEME FOR A COMMUNICATIONS NETWORK

(75) Inventors: Shawn S. Cornelius, Strongsville, OH (US); Clifford Donoughe, Medina, OH (US); Arnold Z. Huffman, Chicago, IL (US); Matthew C. Klug, Hudson, OH (US); Richard R. Krahn, North Lake Elmo, MN (US); Mohan Kurup, Shaker Heights, OH (US); Edward Madden, Oakwood Village, OH (US); David E. Sabaka, North Canton, OH (US); Eric C. Su, Foster City, CA (US); Michael S. Sweeney, Parma Heights, OH (US)

(73) Assignee: Accenture LLP CA (US)

( * ) Notice: Subject to any disclaimer, the term of this patent is extended or adjusted under 35 U.S.C. 154(b) by 336 days.

(21) Appl. No.: 11/810,469

(22) Filed: Jun. 6, 2007

(65) Prior Publication Data
US 2008/0016559 A1 Jan. 17, 2008

Related U.S. Application Data

(62) Division of application No. 09/710,155, filed on Nov. 9, 2000, now Pat. No. 7,254,833.

(51) Int. Cl.
*G06F 9/00* (2006.01)
(52) U.S. Cl. .............................. 726/11; 726/12; 726/14
(58) Field of Classification Search ............... 726/11, 726/12, 14
See application file for complete search history.

(56) References Cited

U.S. PATENT DOCUMENTS 5,623,601 A 4/1997 Vu (Continued)

FOREIGN PATENT DOCUMENTS

CA 2296989 A1 7/2000

(Continued)

OTHER PUBLICATIONS

Formal Verification of Firewall Policies; Liu, A.X.; Communications, 2008. ICC '08. IEEE International Conference on May 19-23 2008 Page(s):1494-1498.*

(Continued)

*Primary Examiner*—David Y Jung
(74) *Attorney, Agent, or Firm*—Brinks Hofer Gilson & Lione (57) ABSTRACT

An electronic security scheme and security system for a communications network facilitates the preventing of unauthorized access to an internal resource of an entity's internal computer system. A server includes a first set of ports for communication between an external communications network and the server. The server has a second set of ports for communications between an internal communications network and the server. A first firewall is interposed between the server and the external communications network. The first firewall is coupled to the first set of ports to provide at least one interconnection between the first set of ports and the external communications network. A second firewall is interposed between the server and the internal communications network. In one embodiment, the second firewall is coupled to the second set of ports to provide in a nonnegative integer number of interconnections between the second of set ports and the internal communications network.

2 Claims, 7 Drawing Sheets

U.S. PATENT DOCUMENTS

| | | | |
|---|---|---|---|
| 5,878,231 | A | 3/1999 | Baehr et al. |
| 5,960,177 | A | 9/1999 | Tanno |
| 6,088,796 | A | 7/2000 | Cianfrocca et al. |
| 6,272,148 | B1 | 8/2001 | Takagi et al. |
| 6,606,708 | B1 | 8/2003 | Devine et al. |
| 7,254,833 | B1 | 8/2007 | Cornelius et al. |

FOREIGN PATENT DOCUMENTS

| | | |
|---|---|---|
| WO | WO 97/12321 A1 | 4/1997 |
| WO | WO 99/15950 A1 | 4/1999 |

OTHER PUBLICATIONS

Doty, Ted, "A Firewall Overview," ConneXions, vol. 9, No. 7, Jul. 1, 1995, pp. 20-23.

Weber, Wolfgang, "Firewall Basics," Telecommunications in modern Satellite, Cable and Broadcasting Services, 1999, 4$^{th}$ International Conference on NIS, Yugoslavia, Oct. 13-15, 1995, IEEE, vol. 1, No. 13, Oct. 13, 1999, pp. 300-305.

Zwicky, Elizabeth D. et al., "Building Internet Firewalls," 2$^{nd}$ Edition.

Author unknown, "CERT Advisory CA-1996-21 TCP SYN Flooding and IP Spoofing Attacks," located at http://www.cert.org/advisories/CA-1996-21.html, allegedly retrieved from the Internet by an Examiner of parent application on Apr. 20, 2004, 9 pages.

Author unknown, Lucent Managed Firewall Version 2.0, located at http://www.sims.berkeley.edu/academics/courses/is250/s99/vendors/lucent/lmf_technical.pdf, allegedly retrieved from the Internet by an Examiner of parent application on Apr. 14, 2004, 10 pages.

Author unknown, "Firewall (networking)," located at http://en.wikipedia.org/wiki/Firewall_(networking), allegedly retrieved from the Internet by an Examiner of parent application on Dec. 9, 2006, 6 pages.

Author unknown, "Definition of: firewall," Website located at http://www.pcmag.com/encyclopedia_term/0,2542,_t=firewall &i=43218,00.asp, allegedly retrieved from the Internet by an Examiner of parent application prior on Dec. 9, 2006, 8 pages.

Author unknown, "firewall," Website located at http://www.webopedia.com/TERM/f/firewall.html, allegedly retrieved from the Internet by an Examiner of parent application on Dec. 9, 2006, 3 pages.

Author unknown, "firewall," Website located at http://thefreedictionary.com/firewall, allegedly retrieved from the Internet by an Examiner of parent application on Dec. 9, 2006, 3 pages.

\* cited by examiner

ELECTRONIC SECURITY SYSTEM AND SCHEME FOR A COMMUNICATIONS NETWORK

This application is a divisional application of U.S. patent application Ser. No. 09/710,155, filed on Nov. 9, 2000, now U.S. Pat. No. 7,254,833, the entire contents of which are incorporated herein by reference.

FIELD OF THE INVENTION

This invention relates to an electronic security system and a security scheme for a communications network.

BACKGROUND

An electronic security system may use password protection, a firewall, or both to prevent an unauthorized user from compromising the integrity of a business-to-business transaction or internal data processing resource of a business entity. An internal data processing resource may include a business-to-business server, an enterprise resource planning system, a data processing system, or any combination of the foregoing items. Because of deficient electronic security systems used in the prior art, a business entity may be impeded to find trading partners that are willing to place their internal data processing resources at risk by engaging in electronic transactions over an external communications network, such as the Internet. The security risks associated with inadequate security systems include misappropriation of confidential information, trade secrets, and proprietary customer information. Moreover, an unauthorized user may corrupt or vandalize software that disrupts the business operations of an entity.

An internal data processing resource may include a password authentication system that provides a log-in and associated password to restrict unauthorized traffic access. Accordingly, the authentication system may protect the entity's internal data processing resources from some exposure to unauthorized external traffic carried via an external communications network (e.g., the Internet). However, the password protection scheme is limited in its effectiveness because an unauthorized user may crack an authorized log-in identifier and password combination by trying numerous combinations or iterations of possible log-in identifiers and passwords, for example.

The password protection scheme is typically supplemented with a firewall protection scheme. A firewall refers to software instructions, hardware, or both that filter traffic to allow only traffic from an approved source or with an approved port identifier to pass through the electronic firewall. The firewall may block out unauthorized traffic from reaching the data communication system from the external communications network. The firewall may prevent unauthorized outsiders from gaining access to internal data processing resources of an entity.

The effectiveness of the firewall approach deteriorates where a web server is interposed in a communications path between the firewall and the external communications network. The web server inherently draws unknown users from the external communications network (e.g., the Internet). Further, security measures for the web server tend to be minimal in comparison to those for the internal data processing resources to keep the web server open and accessible to potential customers and other economic activity. Because of the attendant proliferation in the number of users that the firewall must protect against in the presence of the web server, the internal resources of the data communication system and electronic transactions are more vulnerable to attack.

The task of providing sufficient security to an internal data processing system (e.g., enterprise resource planning system) is further complicated by the requirement of providing access of the internal data processing resources to the external communication network for legitimate business dealings and electronic transactions with trading partners or other users. Thus, the need exists for a security configuration that adequately protects the internal data processing resources of an entity's internal system from unauthorized user access, while providing ready communications access between trading partners.

SUMMARY OF THE INVENTION

In accordance with the invention, an electronic security scheme and security system for a communications network prevents or inhibits unauthorized access to an internal resource of an entity's internal computer system. A server includes a first set of ports for communication between an external communications network and the server. The server has a second set of ports for communications between an internal communications network and the server. A first firewall is interposed in a communication path between the server and the external communications network. The first firewall is in communication with the first set of ports to provide at least one interconnection between the first set of ports and the external communications network. A second firewall is interposed in a communication path between the server and the internal communications network. The second firewall in communication with the second set of ports to provide a nonnegative integer number of interconnections between the second of set ports and the internal communications network.

In accordance with one aspect of the invention, an interconnection of the first firewall is associated with a first port identifier and an interconnection of the second firewall is associated with a second port identifier. An interconnection refers to a communications path between an input port and an output port of a firewall. Further, the first port identifier is different from the second port identifier for each active interconnection such that external penetration of the first firewall by an unauthorized message is blocked by the second firewall.

In accordance with another aspect of the invention, other security measures may complement the assignment of different port identifiers to the first firewall and the second firewall to further enhance the integrity of the security protection of an internal resource.

DETAILED DESCRIPTION

Figure 1:
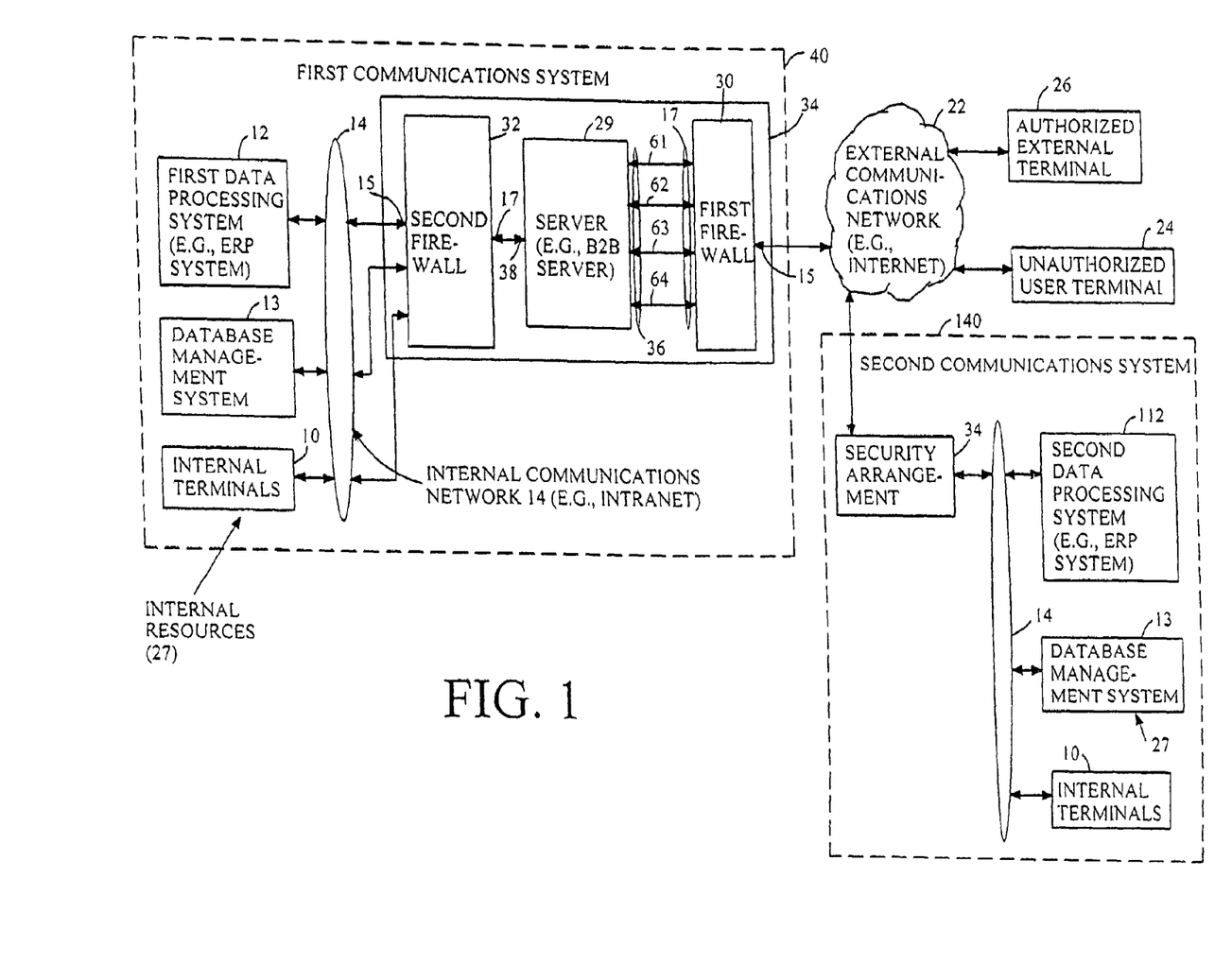
FIG. 1 is a block diagram of a system for providing electronic security for a communications network environment in accordance with the invention.

In accordance with the invention, FIG. 1 shows a first communications system 40 of a first entity coupled to an external communications network 22, such as the Internet. In turn, the external communications network 22 is coupled to a second communications system 140 of a second entity. The first entity and the second entity may be trading partners that exchange transactional data as data messages over the external communications network 22. The external communications network 22 supports communications between an authorized The external communications network 22 may also support communications between an unauthorized user terminal 24 and one of the communication systems (40, 140).

The first communications system 40 includes a security arrangement 34 that may be coupled to the external communications network 22 and an internal communications network 14. The internal communications network 14 may be coupled to one or more of the following internal resources: a first data processing system 12, a database management system 13, and one or more internal terminals 10.

The second communications system 140 includes a security arrangement 34 that may be coupled to the external communications network 22 and coupled to an internal communications network 14. The internal communications network 14 may be coupled to one or more of the following internal resources: a second data processing system 112, a database management system 13, and one or more internal terminals 10.

In general, an internal resource 27 refers to any data processing system that supports an operational activity or business application of an entity or a person affiliated with the entity. An internal resource 27 includes any of the following: a server 29, a first data processing system 12 (e.g., an enterprise resource planning (ERP) system), a database management system 13, a database, and one or more internal terminals 10.

A first data processing system 12 or a second data processing system 112 refers to a computer system that performs a business function or an operational function for a user. An enterprise resource planning system is an example of a first data processing system 12 or a second data processing system 112. An enterprise resource planning system supports sharing of information among different organizational sections or different computer systems of a business entity. For example, in the context of a manufacturing corporation, an enterprise resource planning system may integrate engineering, sales, material management, purchasing, production planning, and accounting functions of the manufacturing corporation. A database management system 13 includes software instructions and hardware for data storage and retrieval (e.g., querying procedures) from one or more databases.

An internal terminal 10 may comprise a client computer, a workstation, or another data processing system that is arranged to communicate via the internal communications network 14. In one embodiment, internal terminals 10 include a first client through an nth client. One client may communicate with another client via the internal communications network 14.

In one embodiment, the security arrangement 34 is positioned in a communications path between an internal communications network 14 and an external communications network 22. The security arrangement 34 may control access to the internal resources 27 via an internal communications network 14, or otherwise. An internal communications network 14 may represent a private network or an intranet. Although the internal resources 27 are coupled to the internal communications network 14 as shown in FIG. 1, in an alternate embodiment, any of the internal resources 27 may be coupled directly to the security arrangement 34 of the invention.

A server 29 supports a transaction or informational exchange between different entities via the external communications network 22. The server 29 may act as an intermediary or an interface between different business entities to assure the proper exchange of data.

In one embodiment, a security arrangement 34 comprises a server 29 sandwiched between a first firewall 30 and a second firewall 32. A first firewall 30 may represent software, hardware, or both. Similarly, the second firewall 32 may represent software, hardware, or both. As shown in FIG. 1, the first firewall 30 represents an exterior firewall, whereas the second firewall 32 represents an interior firewall. An exterior firewall refers to a firewall that is interposed in a potential or actual communications path between the external communications network 22 and the server 29. The interior firewall refers to a firewall that is interposed in a potential or actual communications path between the server 29 and the internal communications network 14 or an internal resource 27.

The first firewall 30 or the second firewall 32 means a system that prevents unauthorized access to or from an internal resource 27. The first firewall 30, the second firewall 32, or both may prevent the unauthorized user from accessing the internal communications network 14 or an internal resource 27 from the external communications network 22. The first firewall 30 and the second firewall 32 may include hardware such as a proxy server, a packet-filtering router, a bastion host, or another data processing system for providing electronic security to an internal resource 27.

Although a variety of firewall configurations are possible and fall within the scope of the invention, in a preferred embodiment the first firewall 30 and the second firewall 32 are implemented by packet-filtering routers. In an alternate embodiment, the security arrangement 34 may be implemented on a single computer such that the first firewall 30, the server 29, and the second firewall 32 represent the logical organization of software instructions within the computer. For the packet-filtering router configuration, the first firewall 30 and the second firewall 32 sample messages or data packets from at least the external communications network 22. The first firewall 30, the second firewall 32, or both preferably have a policy that blocks out data messages or data packets that do not meet a defined security metric. The defined security metric may be expressed as a filtering rule. The packet-filtering router may contain filtering rules that determine which packets are allowed to pass through the first firewall 30 or the second firewall 32 and which packets are blocked by the first firewall 30 or the second firewall 32. The filtering rules of the first firewall 30 may be different from the filtering rules of the second firewall 32.

A data packet sent from an authorized external terminal 26, an unauthorized user terminal 24, or a second data processing system 112 via the external communications network 22 typically has a packet header. Although packet header may differ in data format depending on the applicable communication protocol, in one embodiment Internet protocol (IP) data packets are used. The data packet of an Internet protocol packet header includes an IP source address, an IP destination address, an encapsulated protocol, a source port, a destination port, a message type, the incoming interface of the data packet, and the outgoing interface of the data packet.

An encapsulated protocol defines the format and procedure for transmitting data between communications devices. The encapsulated protocol may represent Transmission Control Protocol (TCP), User Datagram Protocol (UDP), Internet Control Message Protocol (ICMP), Internet Protocol (IP), or some functional combination of the foregoing protocols. TCP and IP are protocols that facilitate communications between host computers and a communications network, such as the Internet. UDP is a connectionless protocol for transferring datagrams (i.e., data packets) over a network that supports IP. ICMP refers to an enhancement of the Internet Protocol that supports data packets containing error, control, and data messages. The source port and the destination port may be assigned as TCP or UDP ports, for example, on the firewalls.

The filtering rules generally analyze the contents of the packet header to determine whether to admit the IP packet for passage through at least one of the firewalls (e.g., 30 or 32) associated with IP header or to block the IP packet associated IP header from passage through at least one of the firewalls. An interconnection of a firewall represents a communication path between an input port and an output port of a firewall. An input port and an output port for an incoming data message may differ from an input port and an output port for an outgoing data message. For example, an input port of a firewall (30, 32) for an incoming data message from the external communications network 22 may become an output port for an outgoing data message over the external communications network 22. Similarly, an input port of a firewall (30,32) for an outgoing data message may become an output port for an incoming data message.

An interconnection or opening refers to a communications path between an input port and an output port of a firewall (30, 32). An input port may be a physical port or a virtual port (e.g., software-contrived emulation) within a computer. Likewise, an output port may be a physical port or a virtual port within a computer. An interconnection may represent the actual electrical connection between an input port and output port of a firewall (30, 32), although in practice a firewall typically includes various layers of software that interface with the physical layer so as to introduce data processing between the input port and output port of the firewall. A lack of any interconnection represents a blocked state in which communications are blocked from progressing through any communications path between an input port and an output port of the firewall (30,32). Blocked data packets or messages may be deleted, returned to the sender, or otherwise processed.

The first firewall 30 provides at least one communications path or interconnection between the server 29 and the external communications network 22. The second firewall 32 may provide a nonnegative integer number of interconnections. The number of interconnections of the second firewall 32 may depend upon a security mode. During a normal security mode, the number of first interconnections of the first firewall 30 is less than or equal to the number of second interconnections of the second firewall 32. Accordingly, the second firewall 32 is able to support multiple internal terminals using the computational resources of the server 29 or accessing the external communications network 22. During a high security mode, the second firewall 32 may provide a selectively active interconnection between the server 29 and the internal communications network 14 to facilitate the interaction of the server 29 with another business entity. For example, a selectively active interconnection of the second firewall 32 may be available at fixed times, upon the occurrence of an event, or on an as-needed basis for a limited duration for the proper or full operation of the server 29.

The first firewall 30 has outer ports 15 and inner ports 17. The outer ports 15 are disposed on an exterior side of the security arrangement 34 toward the external communications network 22. The inner ports 17 are disposed on an interior side of the security arrangement 34 away from the external communications network 22. A combination of an inner port 17 and an outer port 15 has a port identifier. The inner ports 17 may be virtual ports within a computer or physical ports. The first firewall 30 may establish one or more interconnections or data paths between pairs of the outer ports 15 and the inner ports 17. Interconnections of the first firewall 30 (or the second firewall 32) refer to data paths, regardless of whether any direct electrical circuit path is present between the outer ports 15 and the inner ports 17.

The second firewall 32 has outer ports 15 and inner ports 17. The outer ports 15 are disposed on one side of the security arrangement 34 toward the internal communications network 14. The inner ports 17 are disposed on an opposite side of the second firewall 32 away from the internal communications network 14. A combination of inner ports 17 and outer ports 15 has a port identifier. The second firewall 32 may establish zero or more interconnections or data paths between the outer ports 15 and the inner ports 17.

The first firewall 30 and the second firewall 32 facilitates enhanced security by employing one or more of the following techniques: (1) assigning a lesser number (or equal number) of interconnections for the first firewall 30 than the second firewall 32 to restrict access to the internal resources 27 of the entity; (2) allocating different port identifiers for open ports of the second firewall 32 and the first firewall 30 to prevent unauthorized penetration of both the first firewall 30 and the second firewall 32 from an unauthorized user terminal 24 via the external communications network 22; (3) assigning or dedicating particular functions to interconnections or port identifiers of the first firewall 30, the second firewall 32, or both; (4) assigning a packet-filtering key based on a source address of a second data processing system 112 or a first data processing system 12, wherein the packet-filtering key is assigned to a particular port identifier or group of port identifiers of the first firewall 30 and the second firewall 32.

In accordance with a first technique, the arrangement of the first firewall 30 and second firewall 32 restricts unwanted access of an unauthorized user terminal 24 to the internal resources 27 of the first communications system 40 by assigning a lesser number (or equal number) of interconnections for the first firewall 30 than the second firewall 32. Accordingly, the server 29 assigns a lesser number of first set 36 of ports than the second set 38 of ports.

The greater (or equal) number of interconnections associated with the second firewall 32 allows the server 29 to fully support business transactions conducted the second communications system 112, for example. The greater number of interconnections of the second firewall 32 may service the requirements of the internal resources 27 to access external resources available via the external communications network 22. For example, the user of an internal terminal 10 may access a public communications resource (e.g., a website) hosted on the authorized external terminal 26 via the external communications network 22.

Although four possible interconnections are shown in FIG. 1, in one embodiment, as few as one interconnection of the first firewall 30 may support a business-to-business transaction between the first data processing system 12 and the second data processing system 112. That is, three of the four interconnections may remain closed while supporting a business transaction between the first and second entity. The open interconnection may support a business-to-business transaction. The one port may comprise a port that is dedicated to (hypertext transfer protocol) HTTP or (hypertext transfer protocol, secure) HTTPS. Both HTTP and HTTPS support the transfer of hypertext mark-up language (HTML) or extensible mark-up language (XML) documents.

In accordance with second technique for a given data message or data packet, an interconnection of the first firewall 30 (e.g., exterior firewall) is associated with a first port identifier for the outer port 15 and an interconnection of the second firewall 32 (e.g., interior firewall) is associated with a second port identifier for the inner port 17. Further, the first port identifier is different from the second port identifier for each active interconnection of the first firewall 30 and the second firewall 32 such that external penetration of a data message via the first firewall 30 is blocked by the second firewall 32.

The port identifiers of the outer ports 15 of the first firewall 30 differ from the port identifiers of the inner ports 17 of the second firewall 32 such that if an unauthorized data message or packet is able to transgress the first firewall 30 by determining the identity of a port identifier of the outer ports 15 of the first firewall 30, the unauthorized data message or packet is blocked or denied entry into the second firewall 32 by inner ports 17 of the second firewall 32. For example, if the second firewall 32 is embodied as a packet-filtering router, the second firewall 32 rejects entry or passage of a data packet or data message through the second firewall 32 based on the destination port identifier in the data packet.

The destination port identifier in the data packet is compared to the first port identifier of an outer port 15 of the first firewall 30. If the destination port identifier matches the first port identifier, the first firewall 30 permits the data message to pass through an interconnection of the first firewall 30. Similarly, if the destination port identifier in the data packet matches a port identifier of an inner port 17 of the second firewall 32, the data message passes through the second firewall 32 via an interconnection. The passage through the second firewall 32 may be accomplished in accordance with at least two alternative procedures. Under a first procedure, a source (e.g., a second communications system 112) organizes a data packet or incoming message in a data format that supports multiple destination port identifiers. Under a second procedure, the first firewall 30 includes an port identifier translator for translating a received destination port identifier to a revised destination port identifier upon the first firewall's authentication of a data message or data packet. Such an authentication procedure may require validation that the source address matches a list of defined source addresses associated with authorized trading partners, which may include the first entity and the second entity.

The server 29 may be responsible for assigning the appropriate port identifier necessary to penetrate the second firewall 32. Thus, the server 29 may have additional security measures such as encrypted application program and authentication procedures. The data message is authenticated prior to the business-to-business assigning the appropriate port identifier for penetration of the second firewall 32.

In accordance with a third technique of security enhancement, individual ports of the first firewall 30, the second firewall 32, or the server 29 may be assigned or dedicated to particular uses, applications, or functions to provide an additional measure of security. For example, the first set 36 of ports of the server may be assigned or dedicated to particular uses, applications, or functions. If a particular port does not support a use, application, or function, a data message or data packet is not redirected to an appropriate supportive port, but may be logged in a database (e.g., suspect activity log) to track fraudulent activity. As a result, the authorized sender of an incoming data message, an outgoing data message, or both would need to request the correct input port identifier that supports a corresponding desired function in a body of the data message or packet to facilitate transmission through the security arrangement 34 to gain access to the internal resources 27.

In accordance with a fourth technique, the first firewall 30 or the second firewall 32 may use packet-filtering to block all data messages or packets from passage through the first firewall 30 or the second firewall 32, respectively, so long as the message or packet does not have an authorized source address (e.g., set forth in the header of a corresponding data packet) or some other packet-filtering key. An authorized source address is affiliated with a data processing system or a server of a trading partner, such as the first entity or the second entity.

Although FIG. 1 shows four communications lines between the first firewall 30 and the server 29 and one communication line between the second firewall 32 and the server 29, other configurations of communications lines are possible and fall within the scope of the invention. As shown in FIG. 1, the first firewall 30 supports four interconnections, designated a primary interconnection 61, a secondary interconnection 62, a tertiary interconnection 63, and quaternary interconnection 64. As few as one of the interconnections (e.g., the primary interconnection 61 or secondary interconnection 62) may be used to support full functionality of the business-to-business transactions between the first data processing system 12 and the second data processing system 112. Each of the interconnections has its own security protection against unauthorized traffic by virtue of the restricted functionality of the interconnection and associated inner ports 17 and outer ports 15. Accordingly, if only one interconnection is used, the interconnection may represent an all-purpose interconnection for carrying an assortment of different types of traffic.

The primary interconnection 61 supports regular HyperText Transfer Protocol (HTTP) traffic, but blocks other types of traffic. HyperText Transfer Protocol (HTTP) refers to a protocol that defines how data messages are formatted, transmitted, and processed for Web servers and browsers. HTTP traffic includes HTML documents an XML documents. HTTP traffic supports ordinary web-page transfer requests and responses. Further, in one embodiment, the primary interconnection 61 only allows traffic from specific source address, a specific destination address, or both to pass through the first firewall 30.

The secondary interconnection 62 allows encrypted HTTP traffic or Secure Socket Layer (SSL) traffic to pass through the first firewall 30, but blocks virtually all other types of traffic. Secure or encrypted HTTP traffic may be regarded as HTTPS. HTTPS is a variant or extension of HTTP that is supported by certain web-servers and browsers. SSL supports establishing a secure connection between network devices communicating over the external communications network 22, whereas HTTP supports the transmission of secure messages. XML documents and HTML documents may be transmitted as HTTPS traffic. In one embodiment, the secondary interconnection 62 only allows traffic from specific source address, a specific destination address, or both to pass through the first firewall 30.

The tertiary interconnection 63 supports monitoring of a server (e.g., webMethods B2B server, where webMethods and webMethods B2B are trademarks of webMethods, Inc.) and its constituent components. The quaternary interconnection 64 may support system monitoring and operations maintenance of an internal resource 27 via a software application for monitoring system components.

The security arrangement 34 may further enhance security provided by the first firewall 30 and the second firewall 32 by operating the server (e.g., server 29) in a proxy mode or as a bastion host mode. The proxy mode and bastion host mode may supplement any of the aforementioned techniques, including those techniques referred to as the first technique through the fourth technique, inclusive. While allowing a second communications system 112 to exchange data with the server 29, the server 29 may act as a proxy server for an internal resource 27 (e.g., first data processing system 12) so that the remote processing system 112 never has to directly access the internal resource 27 of the first communications system 40. In accordance with a proxy mode, the server 29 may merely grant access of the second data processing system 112 to the server 29, which acts as an intermediary between the second data processing system 112 and the first data processing system 12. For example, the second data processing system 112 may communicate with the server 29, which relays information to the first data processing system 12 (e.g., ERP system) via the internal communications network 14. Accordingly, the second data processing system 112 does not need to know and does not receive the network configurations of the internal communications network 14 to communicate with the first data processing system 12. Therefore, the integrity of the internal communications network 14 and the internal resources 27 is preserved, at least to some extent, by not sharing information on the configuration of the internal communications network 14 with the second data processing system 112, the authorized external terminal 26, or the unauthorized user terminal 24.

In one embodiment, the server 29 may be implemented as a bastion host where security is provided on an application level, as opposed to the network layers security level of the packet filtering of the first and second firewalls (30, 32). The bastion server may only support limited or enumerated applications or functions thereof, while other services that might otherwise be supported by the server 29 are denied to further promote security. Although an additional proxy communications program could be installed in the server 29 to support e-mail and yet another proxy communications program could support world-wide-web access the server 29 may be limited to containing proxy communications program for business-to-business services between different trading partners such as the first entity and the second entity in one embodiment.

The server 29 may run an encrypted operating system and may have a proxy program to provide a service on a proxy basis to internal terminals 10 or external terminals 26. Further, the server 29 may be intentionally restricted in its ability to communicate with network elements of the internal communication network 14.

In an alternate embodiment, the external communications network 22 includes a private communications network or a virtual private communications link over the Internet. A private communications network may be less susceptible to tampering and eavesdropping than internal communications networks 14 of different business entities that communicate over the Internet. Accordingly, the first communications system and the second communications system may exchange data messages or engage in electronic transactions via a private communications channel, an encrypted communications channel, or virtual private communications link, or the like.

Figure 2:
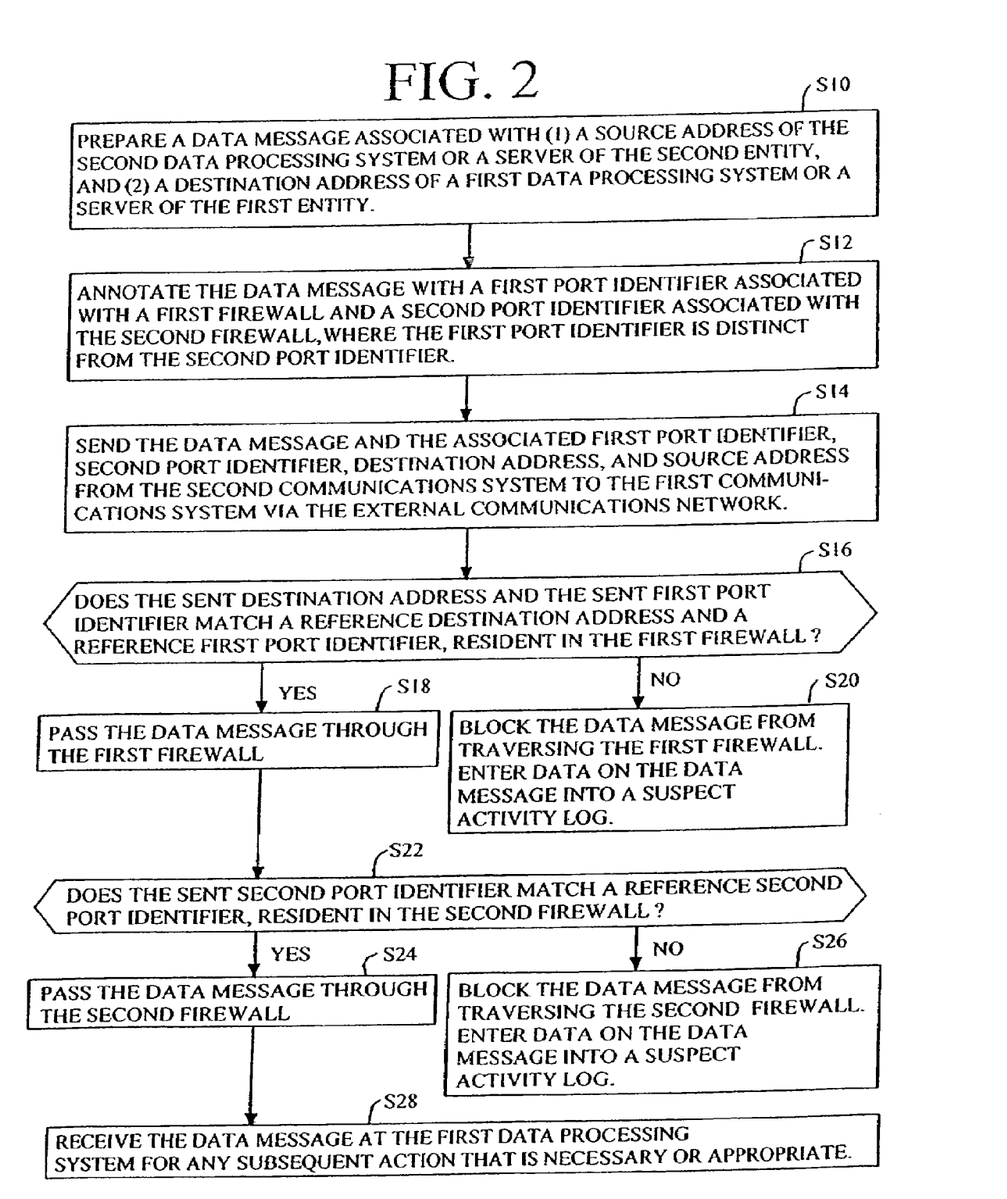
FIG. 2 is a flow diagram of one embodiment of a method for providing electronic security for a communications network in accordance with the invention.

FIG. 2 is a flow chart of a method for providing security for communications between a first communications system 40 of first entity and a second communications system 140 of second entity over an external communications network 22. The method of FIG. 2 starts in step S10.

In step S10, a second communication system 140 prepares a data message associated with (1) a source address of the second data processing system 112 or a server of the second entity, and (2) a destination address of the first data processing system 12 or a server 29 of the first entity. The source address of a server (e.g., server 29) may be used where the server operates in a proxy mode or as an intermediary on behalf of the first data processing system 12 and the second data processing system 112.

In step S12, the second communications system 140 annotates the data message with a first port identifier associated with a first firewall 30 and a second port identifier associated with a second firewall 32. The first port identifier is distinct from the second port identifier. The first port identifier and the second port identifier may be established or updated by mutual agreement of the first and second entities.

In step S14, the second communications system 140 sends the data message and the associated first port identifier, the second port identifier, the destination address, and the source address from the second communications system 140 to the first communications system 40 via the external communications network 22.

In step S16, the first firewall 30 determines the following: (1) whether the sent destination address matches a reference destination address and (2) whether the sent first port identifier matches a reference first port identifier, which is resident in and associated with an active interconnection or opening in the first firewall 30. An interconnection associated with the first port identifier may be open or active for a general purpose (e.g., any traffic) or a limited purpose (e.g., traffic related to a single business-to-business transaction or a group of business-to-business transactions). If the sent destination address matches the reference destination address and if the sent port identifier matches the reference port identifier, then the method continues with step S18. Otherwise, the method continues with step S20.

In step S18, the first firewall 30 passes the data message through an interconnection of the first firewall 30. In an alternate embodiment, the first firewall 30 may apply other security measures prior to passing the data message through the first firewall 30. For example, in the alternate embodiment, the first firewall 30 may determine that a defined functionality indicator in a data message matches a reference functionality indicator, resident in the first firewall as a necessary condition to passing the data message through the first firewall 30.

In contrast, in step S20 the first firewall 30 blocks the data message from traversing the first firewall 30. The first firewall 30 enters data into a suspect activity log. A user or operator may view and investigate the suspect activity log to thwart or identify an unauthorized user that has attempted illicit access of the first communication system 40.

In step S22 after step S18, the sent second firewall 32 determines if the sent second port identifier matches a reference second port identifier, which is resident in and associated with an active interconnection or opening in the second firewall 32. The reference second port identifier is preferably different from the reference first port identifier, such that access through the first firewall 30 does not automatically provide access through the second firewall 32. An interconnection associated with the second port identifier may be open or active for a general purpose (e.g., any traffic) or a limited purpose (e.g., traffic related to a single business-to-business transaction or a group of business-to-business transactions). If the sent second port identifier matches a reference second port identifier, then the method continues with step S24. However, if the sent second port identifier does not match the reference second port identifier, the method continues with step S26.

In step S24, the second firewall 32 passes the data message through the second firewall 32. In an alternate embodiment, the first firewall 30 may apply other security measures prior to passing the data message through the second firewall 32.

In step S26, the second firewall 32 blocks the data message from traversing the second firewall 32. The second firewall 32 enters data on the data message into a suspect activity log so that user or operator can thwart fraudulent or illicit activity of an unauthorized user terminal.

In step S28 after step S24, the first data processing system 12 receives the data message at the server for any subsequent action that is necessary or appropriate. Other security measures disclosed in conjunction with FIG. 1 may supplement the method of FIG. 2 to foster protection of the electronic transactions between the first and second entities.

Figure 3:
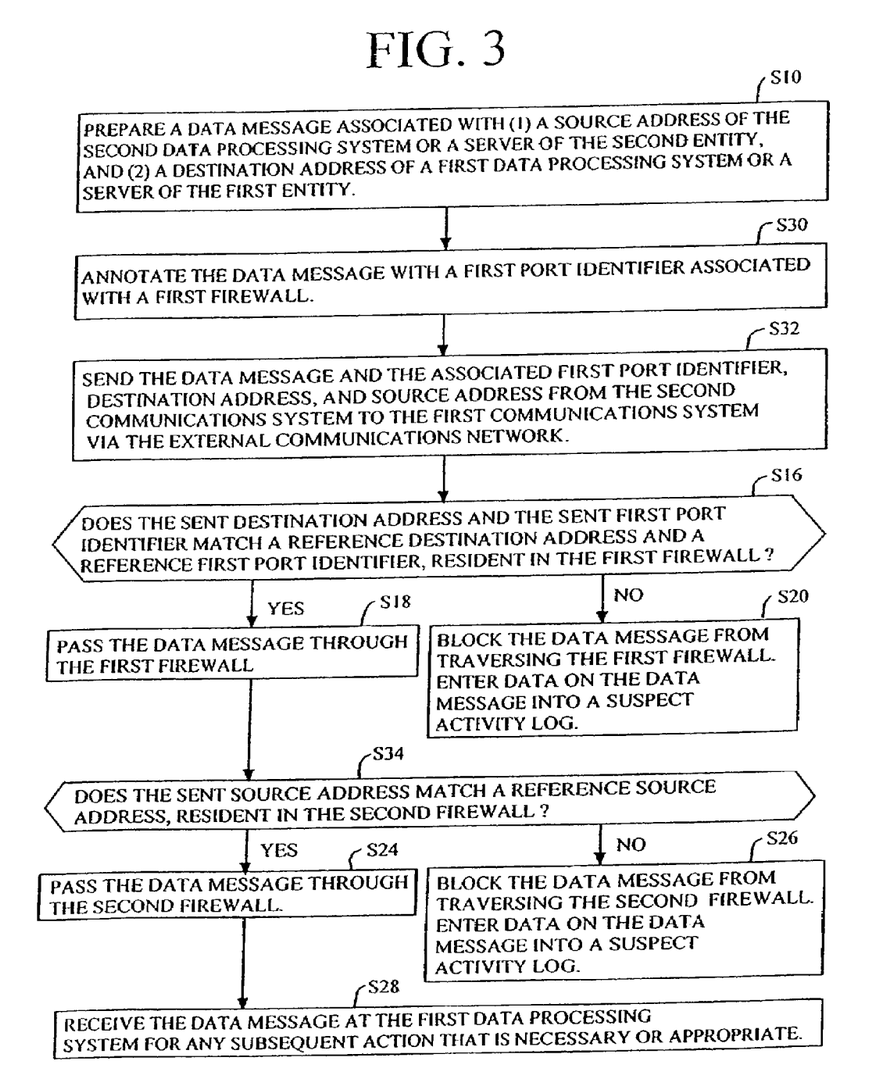
FIG. 3 is a flow diagram of another embodiment of a method for providing electronic security for a communications network in accordance with the invention.

The method of FIG. 3 is similar to the method of FIG. 2. Like reference numbers in FIG. 2 and FIG. 3 indicate like steps. However, FIG. 3 differs from FIG. 2 in that step S30 replaces step S12, step S32 replaces step S14, and step S34 replaces step S22.

Step S30 follows step S10. In step S30, the second communications system 140 annotates the data message with a first port identifier associated with a first firewall 30. That is, the second communications system 140 may not annotate the data message with the second port identifier associated with a second firewall 32 to conserve spectral bandwidth or because a security risk is lowered from other actively deployed security measures.

In step S32 after step S30, the second communications system 140 sends the data message and the associated first port identifier, destination address, and source address from the second communications system 140 to the first communications system 40 via the external communications network. The source address may represent an address of the second data processing system 112 or an affiliated server.

Skipping to step S34, which follows step S18, the second firewall 32 determines whether the sent source address matches a reference source address, resident in the second firewall 32. Thus, step S34 uses the sent source address as an identifier that is distinct from the first port identifier of the first firewall 30 to prevent an unauthorized user from gaining access to the first data processing system 12. If the second firewall 32 determines that the sent source address matches the reference source address, the method continues with step S24. If the second firewall 32 determines that the sent source address does not match the reference source address, the method continues with step S26. In accordance with the method of FIG. 3, the second source address may be used regardless of any second port identifier or first port identifier associated with the data message.

FIG. 4 through FIG. 7 show that the security system (including the security arrangement 34) of the present application may be configured independently of the configuration associated with the existing internal communications system configuration and any existing security arrangement. Like reference numbers in FIG. 1 and FIG. 4 through FIG. 7 indicate like elements. The remote communications system 240 may include a security arrangement and a second data processing system similar or identical to those of FIG. 1. In FIG. 4 through FIG. 7, the setup of the business-to-business, security arrangement (e.g., security arrangement 34) is generally the same, regardless of the existing security system. The security arrangement 34 is added to an existing server configuration in a modular fashion. Thus, the security system of the present invention is amenable to standardization, which facilitates reduced configuration time and reduced setup cost.

The security arrangement 34 may be produced in accordance with a single specification or group of specifications, rather than a customized solution, to fit most customers' requirements. Servicing and maintenance of the security arrangement 34 may follow universal guidelines regardless of the existing server topology. Accordingly, implementation of the systems is readily staged or tested in advance of actual deployment in the field to improve overall quality. Sales and marketing personnel and marketing may be provided with standard server configurations having known costs, rather than a customized system that might require specialized intervention of engineering or information technology professionals on a case-by-case basis.

Figure 4:
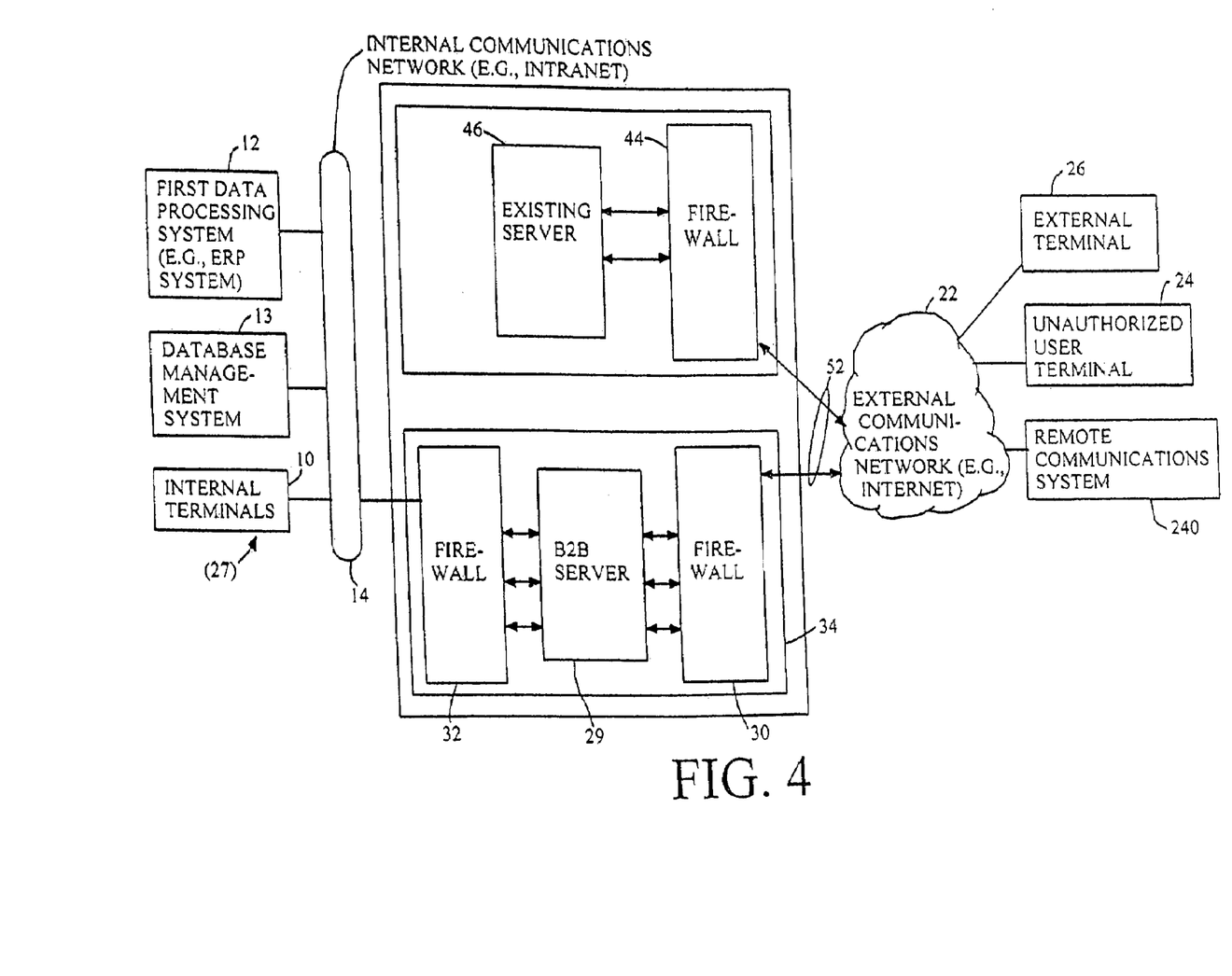
FIG. 4 through FIG. 7 show various illustrative applications of dual-wall security arrangements in accordance with the invention.

FIG. 4 shows a security arrangement 34 installed at a business entity with an existing server 46 such that two main connections 52 to the external communication network 22 are provided. For example, each main connection 52 may represent a T1 line (or E1 line) to the external communications network 22 via an Internet service provider (not shown).

The existing server 46 of FIG. 4 is preferably not coupled to the internal communications network 14 of the entity. As a result, an unauthorized user poses virtually no threat to the security of the internal communications network 14 (or affiliated internal resources 27) via the existing server 46. The integrity of the existing server 46 itself is maintained and preserved by an outer firewall 44 which may represent a packet filtering router, a proxy server and an application gateway, or the like.

Even if the integrity of the existing server 46 were compromised and an unauthorized user terminal 24 gained access to the existing server 46, the unauthorized user would not obtain any information on the network configuration of the internal communication network 14, nor would the unauthorized user terminal 24 be able to vandalize, disrupt or disable the server 29 in any fashion whatsoever. If the unauthorized user gains control of the existing server 46 such control is irrelevant to the server 29 (e.g., a business-to-business server), because the server 29 preferably does not treat the existing server 46 as a trusted server, but as any other external or foreign server that is coupled to the external communication network 22.

Figure 5:
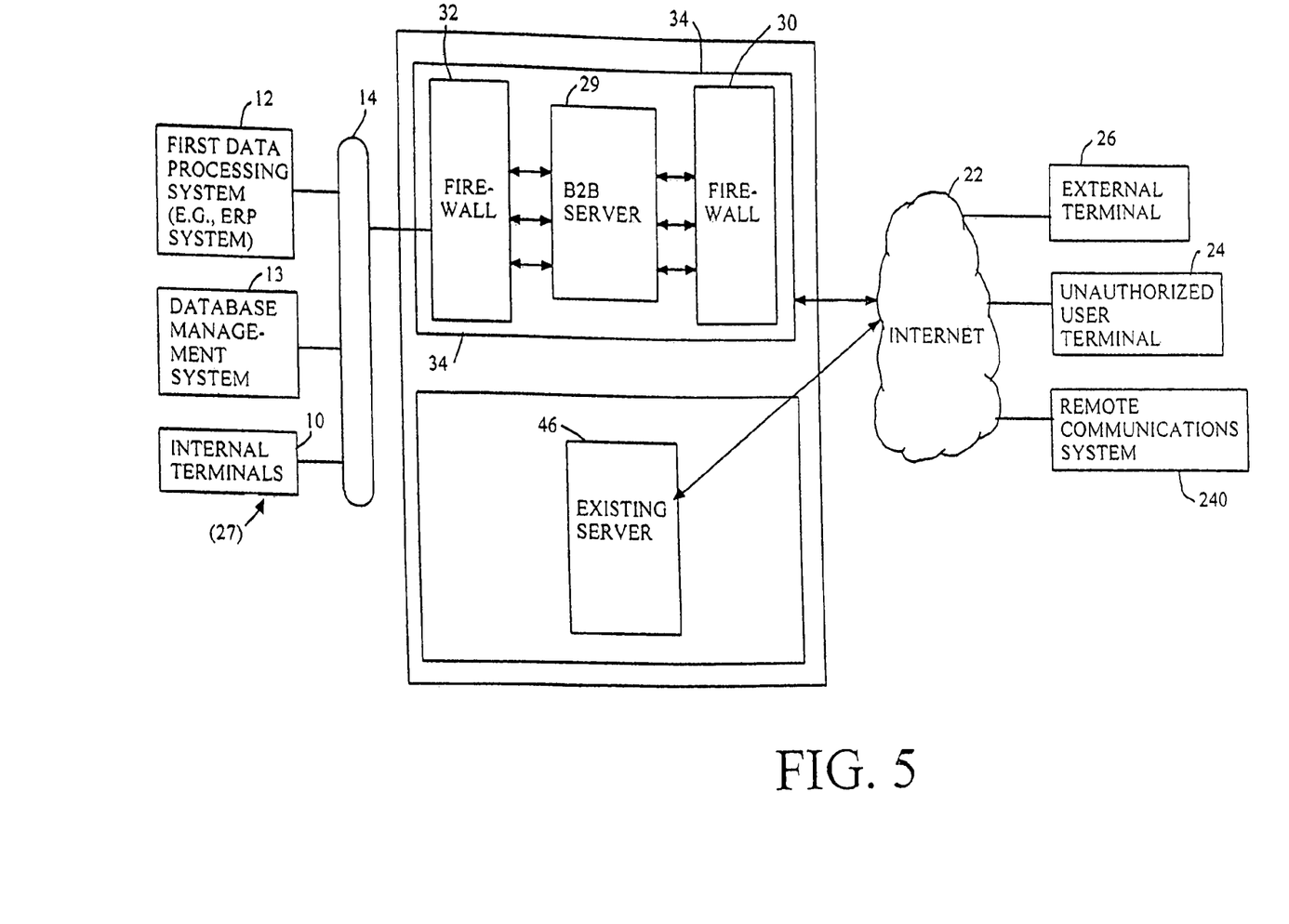

FIG. 5 shows an example where the existing server 46 is not protected by a firewall. Instead, the existing server 46 may rely upon other security measures. For instance, the existing server 46 may rely upon a password and a log-in identifier to authenticate users and prevent unauthorized access in the example of FIG. 5. Further, the operating program and application program of the existing server 46 may be encrypted to prevent or deter alteration of any of the programs. Even if the security measures of the existing server 46 of FIG. 5 are compromised, such a failure of the security is irrelevant to the server 29 with the security configuration 34 for the reasons previously discussed in conjunction with FIG. 4.

Figure 6:
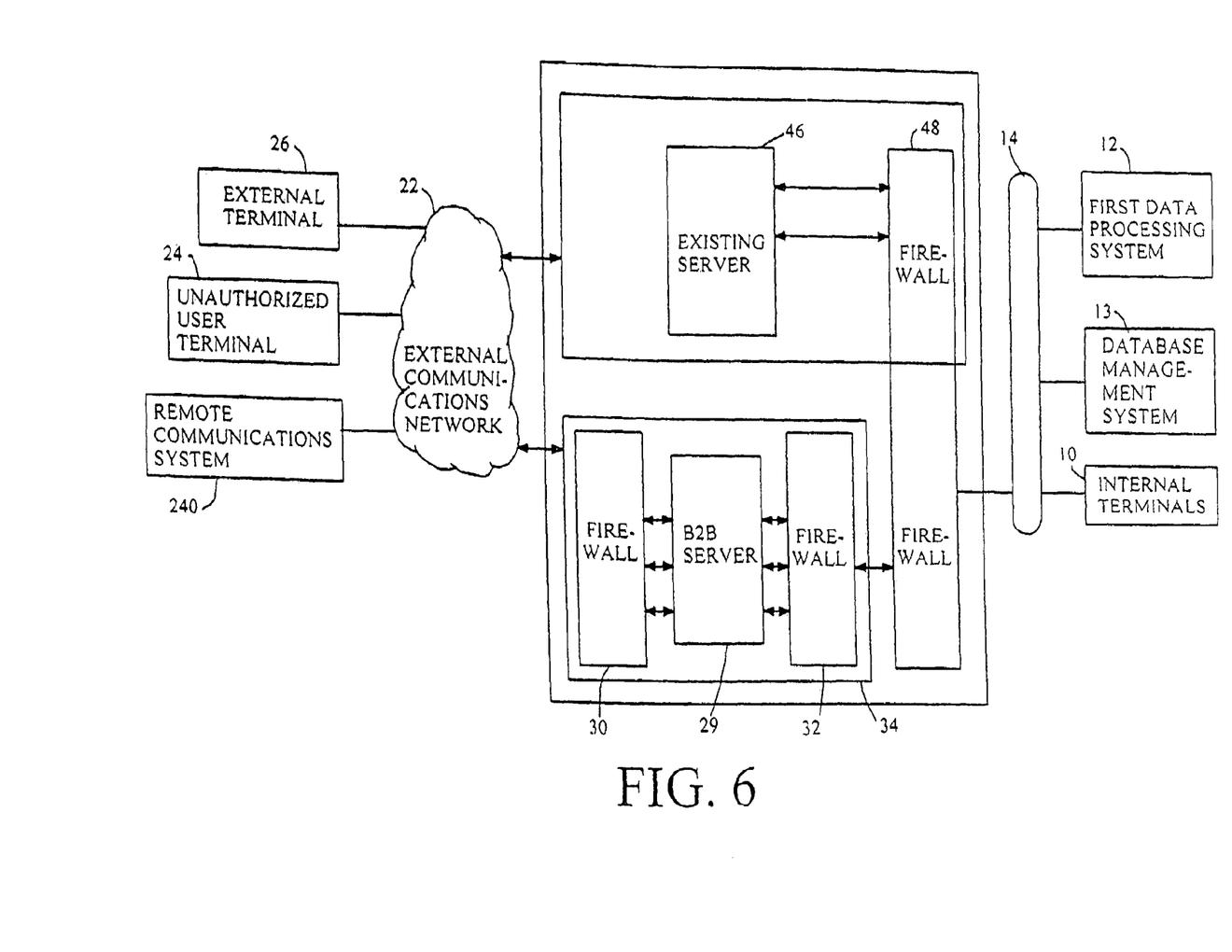

FIG. 6 shows an installation of the security arrangement 34 in conjunction with an existing server 46 where an additional inner firewall 48 may be used in tandem with the security arrangement 34. The additional inner firewall 48 preferably provides a complimentary technique or different firewall technique than the first firewall 30 or the second firewall 32 of the security arrangement 34. Accordingly, if the first firewall 30 and the second firewall 32 represent packet filtering routers, then the additional inner firewall 48 comprises an application gateway, a circuit level gateway, or a proxy server to further enhance the security of the overall system.

Figure 7:
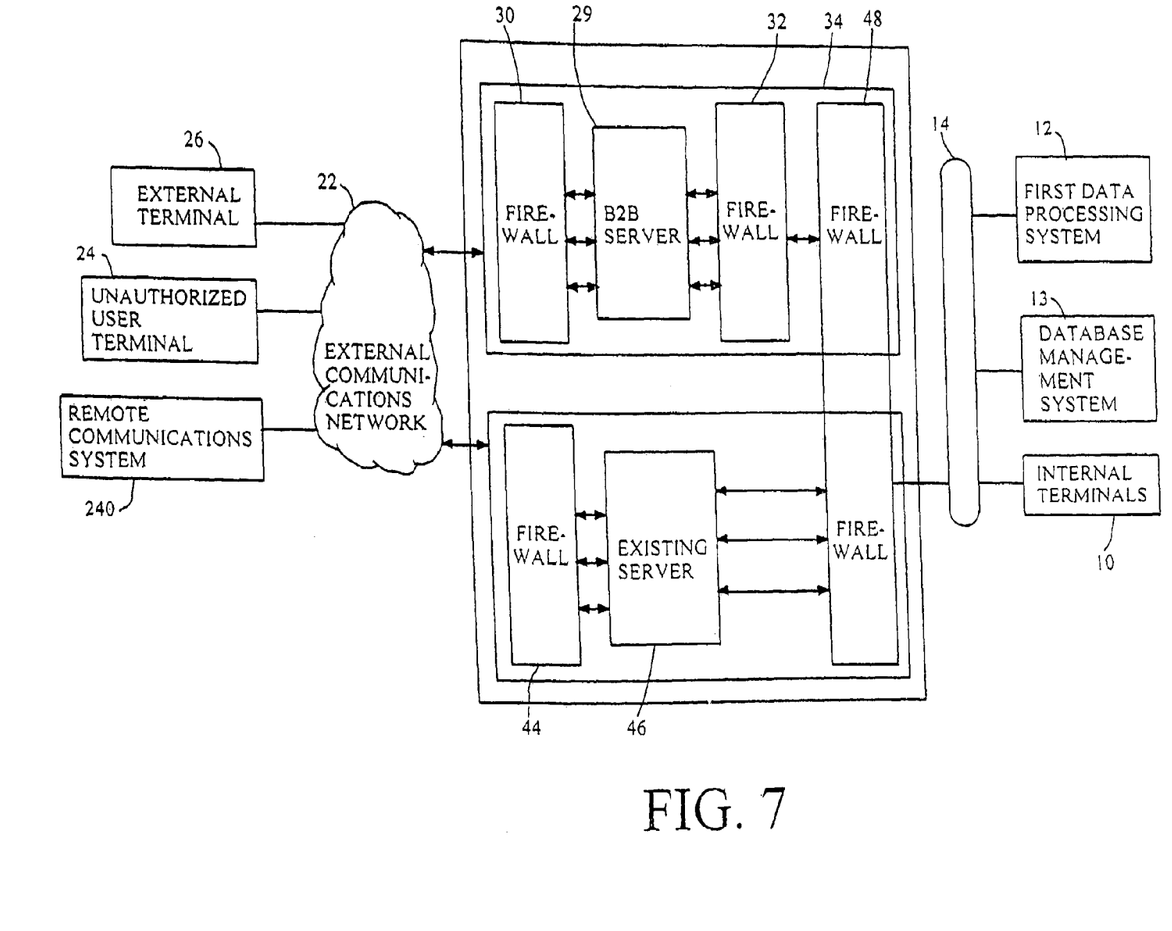

FIG. 7 is similar to FIG. 6, except FIG. 7 contains an additional outer firewall 44 that protects the existing server 46. The additional outer firewall 44 has any firewall configuration, including a packet-filtering router. The outer firewall 44 was previously described in conjunction with FIG. 4.

FIG. 4 through FIG. 7 illustrate that the dual firewall configuration 34 and server 29 may be implemented readily as a standard modular package in a standard configuration that is staged, installed and supported in a consistent and repetitious manner. The standardization of the configuration promotes managing business logistics and minimizing cost in the manufacturing, installation, maintenance, and operation of the security system of the invention.

In general, the security arrangement 34 of the invention is well suited for facilitating business-to-business transactions between the first entity and the second entity free from disruption or security breaches that might otherwise be caused by an unauthorized user terminal 24. The security arrangement 34 provides electronic security with respect to traffic on an external communications network 22 (e.g., the Internet) to prevent an unauthorized user terminal 24 from gaining access to an internal resource 27 of first communications system 40 or the second communications system 140.

Various modifications of the security system and security scheme may fall within the scope of the invention disclosed herein. For example, in an alternative embodiment the server 29 may provide a proxy server that includes an application level filter to incoming traffic from the external communication network, while providing a circuit level gateway to outgoing communication from the internal communications network 14 or terminal coupled thereto. Although in a preferred embodiment the server 29 does not support access of the internal terminal 10 to the world-wide-web or e-mail services via the server 29, in an alternative embodiment a circuit level gateway can provide access to the world-wide-web, e-mail or other Internet related services. The circuit level gateway may be associated with potentially slight degradation in the security offered to the business entity with respect to attacks by an unauthorized user.

A circuit level gateway provides a communication mechanisms for a TCP or a UDP connection. A TCP or transmission control protocol represents a protocol applicable to TCP-IP network. The IP protocol port identifiers the format of the data packets while the TCP enables host to establish a connection to exchange a stream of data such that the delivery of the data is accomplished in the same order in which it was sent from the transmitting host. UDP or User Datagram Protocol refers to a data packet protocol for switched packet networks, which provides minimum error recovery support and may be used for broadcasting messages over an external or internal communication network.

The foregoing description of the security system and security scheme describes several illustrative examples of the invention. Modifications, alternative arrangements, and variations of these illustrative examples are possible and may fall within the scope of the invention. Accordingly, the following claims should be accorded the reasonably broadest interpretation, which is consistent with the specification disclosed herein and not unduly limited by aspects of the preferred embodiments disclosed herein.

The following is claimed:

1. A method for providing security for an electronic transaction between entities over a communications network, the method comprising:
    sending a data message containing an electronic transaction from a first entity to an input port associated with a plurality of firewalls, wherein said input port is interconnected to a nonnegative number of interconnections;
    determining a security mode; and
    selecting the nonnegative number of interconnections based on said determined security mode.

2. A method for providing security for an electronic transaction between entities over a communications network, the method comprising:
    sending a data message containing an electronic transaction from a first entity to an input port associated with a firewall that has interconnections, wherein said port and interconnections are dedicated to support corresponding functions; and
    blocking said data message if said corresponding functions do not correspond to a function for processing said data message.

* * * * *